United States Patent
Deprez et al.

(10) Patent No.: US 11,455,311 B2
(45) Date of Patent: Sep. 27, 2022

(54) MULTI-LOCATOR SYSTEM FOR TRACKING DATA ELEMENTS IN RESOURCES

(71) Applicant: Datadog, Inc., New York, NY (US)

(72) Inventors: Sebastien Deprez, Paris (FR); Mathieu Rousse, Saint-Rémy-lès-Chevreuse (FR)

(73) Assignee: Datadog, Inc., New York, NY (US)

(*) Notice: Subject to any disclaimer, the term of this patent is extended or adjusted under 35 U.S.C. 154(b) by 510 days.

(21) Appl. No.: 16/370,344

(22) Filed: Mar. 29, 2019

(65) Prior Publication Data

US 2020/0311091 A1    Oct. 1, 2020

(51) Int. Cl.
*G06F 16/20* (2019.01)
*G06F 16/2457* (2019.01)
*G06F 16/23* (2019.01)
*G06F 16/22* (2019.01)

(52) U.S. Cl.
CPC .... *G06F 16/24578* (2019.01); *G06F 16/2228* (2019.01); *G06F 16/2379* (2019.01)

(58) Field of Classification Search
CPC .......... G06F 16/24578; G06F 16/2379; G06F 16/2228
See application file for complete search history.

(56) References Cited

U.S. PATENT DOCUMENTS

| | | | |
|---|---|---|---|
| 2007/0150365 A1* | 6/2007 | Bolivar | G06Q 30/0641 705/26.61 |
| 2013/0227397 A1 | 8/2013 | Tvorun | |
| 2019/0340224 A1* | 11/2019 | Akhoury | G06F 16/958 |
| 2020/0250575 A1* | 8/2020 | Ie | G06N 3/0445 |

FOREIGN PATENT DOCUMENTS

EP    1 164 498 A1    12/2001

OTHER PUBLICATIONS

Leotta et al., *Using Multi-Locators to Increase the Robustness of Web Test Cases*, http://sepl.dibris.unige.it/publications/2015-leotta-ICST (2015) (11 pages).

(Continued)

*Primary Examiner* — Tarek Chbouki
(74) *Attorney, Agent, or Firm* — Fish & Richardson P.C.

(57) ABSTRACT

Methods and systems are configured for tracking content represented in a resource. A modified version of structure data of a resource that includes at least one element is received. Each element represents content of the resource in the structure data. Each element includes a portion of the structure data that defines the content. Data specifying a target element of the structure data is received. A plurality of locators for the target element are obtained. A locator of the plurality is derived as a function of a frequency that one or both of attributes and classes of the target element appear in the structure data and includes a subset of the attributes and the classes, the subset uniquely identifying the target element. The plurality of locators including the locator are applied to a modified version of the structure data to extract a modified version of the target element.

20 Claims, 11 Drawing Sheets

(56) References Cited

OTHER PUBLICATIONS

Leotta et al.,*ROBULA / ROBULA+: Robust XPath Locator Algorithms*, Software Engineering & Programming Languages Research Group, Dipartimento di Informatica, Bioingegneria, Robotica e Ingegneria dei Sistemi (DIBRIS)—University of Genova, http://sepl.dibris.unige.it/ROBULA.php (2016) (5 pages).

Yandrapally et al., *IBM Research Report: Robust Test Automation Using Contextual Clues*, RI14005 Computer Science, (Feb. 21, 2014) (19 pages).

*A New Way for Cross Browser CSS Debug*, ip.com Journal, ip.com Inc., West Henrietta, NY, US, May 13, 2013 (7 pages).

International Search Report and Written Opinion for Intl App No. PCT/US2020/024691, dated Jun. 19, 2020 (14 pages).

\* cited by examiner

| Locator | Locator 1<br>Class X-Path | Locator 2<br>Attribute X-Path | Locator 3<br>Absolute X-Path | Locator 4<br>Robula X-Path |
|---|---|---|---|---|
| | //[@class="blue"] 502a | //[@img="2"] 502b | /html/body/div[2] 502c | //span 502d |
| Weight | 2 504a | 2 504b | 5 504c | 1 504d |
| Vote | Element A 506a | Element B 506b | Element B 506c | N/A 506d |
| Update? | //[@class="gray"] 508a | N/A | N/A | //img="2" 508b |

502
504
506
508

512 <div class="blue"></div>  Element A

514 <div class="gray" img="2"></div> SELECT TO START  Element B

516 <div class="red" img="1"></div>  Element C

518 Score: 2 | 7 | 0

520
```
<html>
<body>
<span></span>
<div class="red" img="1"></div>
<div class="gray" img="2"></div>
<div class="blue"></div>
</body>
</html>
```

MULTI-LOCATOR SYSTEM FOR TRACKING DATA ELEMENTS IN RESOURCES

TECHNICAL FIELD

The disclosure relates to tracking data elements in resources, including identifying a data element in a resource.

BACKGROUND

Computer systems can be used to transmit, receive, and/or process data. For instance, a server computer system can be used to receive and store resources (e.g., web content, such as a webpage), and make the content available to one or more client computer systems. Upon receiving a request for the content from a client computer system, the server computer system can retrieve the requested content, and transmit the content to the client computer system to fulfill the request.

The format and presentation of the content of a webpage can be specified at least in part by structure data (e.g., HTML). To modify the format and presentation of the webpage, the structure data can be modified. Thus, if the webpage is modified between a first request for the webpage and a second request for the webpage, the structure data received by a client computer system in response to the second request for the webpage can be different from the structure data received in response to the first request by the client computer system.

SUMMARY

Implementations of the subject matter described herein can provide various technical benefits. For instance, in some implementations, the subject matter described herein includes a computing system configured to identify (and extract) a particular data element (representing a portion of content) of a resource (e.g., a webpage). The computing system can identify the data element even when that particular data element is modified (e.g., by a content publisher hosting the resource) between requests for the resource by the computing system. The computing system can identify the modified version of the element even when no data indicative of the modification (e.g., other than the resource) is provided to the computing system. For example, a computing system can include an application (e.g., a browser plugin) that tracks how often a button (or other element) is selected by users of a webpage. The application can log these interactions over time and report how often the particular element is selected. However, when the resource is modified, the format, presentation, etc. of the element can be changed, and the application can have difficulty determining which element of the modified resource (if any) correspond to the previously identified element.

To overcome this problem, for example, the techniques described herein provide a multi-locator system that is configured to identify the data element even when the data element is modified. The computing system generates locators which are configured to parse the structure data that defines the element and that is associated with the resource. The locators include class-based locators and attribute-based locators that are configured to identify the element based on one or more classes of the element and one or more attributes of the element, respectively. The locators can work in tandem to determine which element of a modified resource corresponds to the target element identified in the resource before modification. If one or more classes and/or attributes of the element are modified, the locators can still identify the element as the target element. The locators do this based on several factors, such as the position of the element in the structure data, one or more unchanged classes and attributes, and so forth. In some aspects, the multi-locator system is configured to use classes and attributes of a parent element of the target element.

The multi-locator system provides a robust mechanism for tracking a particular element from version to modified version of the resource. If one locator that is configured to identify a particular class, classes, attribute, or attributes fails (e.g., because that particular class or attribute has been changed), the remaining locators are still able to find the element. Furthermore, the failing locator(s) can be updated based on the selected element's attributes, location in the structure data (e.g., X-path), and class. The locator(s) that failed are redefined by the computing system based on the updated structure data. Thus, even if the element is completely modified over time, the multi-locator system can still identify the element from the structure data of the resource.

Furthermore, each locator of the multi-locator system can be weighted based on a confidence that is trained with training data. Locators that have shown more success, such as those that point to attributes, classes, or other data that more uniquely define the element and change less often, can be weighted more heavily than other locators that fail more easily. Thus, a single, reliable locator can outweigh several other locators that are less reliable. The weights can be developed heuristically with training data for particular resources. For example, the computing system can train the weights for the locators either by providing actual series of versions of a webpage showing evolution of that webpage, or by providing simulated changes to a webpage.

In an aspect, the multi-locator system is configured to perform actions including receiving, by at least one processor, a modified version of structure data including a description of a resource that includes at least one element. Each element can represent content of the resource in the structure data and where each element includes a portion of the structure data that defines the content. The actions include receiving, by the at least one processor, data specifying a target element of the structure data. The modified version of the structure data can include a modified version of the target element. The actions include obtaining, by the at least one processor, a plurality of locators for the target element. At least one of the locators of the plurality can be derived as a function of a frequency that each of one or both of attributes and classes of the target element appear in the structure data. The at least one locator can include a subset of one or both of the attributes and the classes. The subset can uniquely identify the target element in the structure data. The actions include applying the plurality of locators including the at least one locator to the modified version of the structure data to extract the modified version of the target element.

In an aspect the actions further include receiving, by the at least one processor, the structure data including the description of the resource, the structure data including the target element. The actions further include determining, by the at least one processor, the frequency that each of one or both of attributes and class of the target element of the training data appear in the structure data. The actions further include generating, by the at least one processor, the at least one locator based on the frequency.

In an aspect, the at least one locator is a first locator including a first subset, and the actions further include generating a second locator associated with the target element. The second locator can include a second subset of one or both of the attributes and the class. The second subset can be different from the first subset. The actions can include generating a first weight value for the first locator based on a first frequency of the first subset occurring in the structure data. The actions can include generating a second weight value for the second locator based on a second frequency of the second subset occurring in the structure data.

In an aspect, extracting the modified version of the target element includes identifying, by each of the first locator and the second locator, a respective element of the modified version of the structure data as being a candidate modified version of the target element so as to provide a plurality of candidate modified versions of the target element. The actions further include selecting the modified version of the target element from the plurality of candidate modified versions of the target element based on the respective first and second weight values of the first and second locators.

In an aspect, the actions include determining that at least one locator, of the first locator and the second locator, selected an incorrect element as being the modified version of the target element, and updating the at least one locator to include a different combination of one or both of attributes and class based on another locator that correctly selected the target element.

In an aspect, the second locator comprises an absolute X-path associated with the target element. In some implementation, the at least one locator comprises one or more attributes or classes of a parent element. In some implementations, the at least one locator is associated with a weight value based on training data.

In an aspect, the training data is generated based on a plurality of selections of different occurrences of the element in the resource by the user. In an aspect, the training data are automatically generated based on a simulated modification to the resource.

In some implementations, the actions include retrieving an X-path associated with the target element; and parsing the X-path to identify one or both of the attributes and the class of the target element. In some implementations, the actions include updating the locator based on one or both of updated attributes and an updated class of the modified version of the target element.

In an aspect, at least five locators are obtained for the target element.

In an aspect, the element corresponds to a graphical feature of the resource that is configured for presentation when the resource is accessed. The structure data can include the description of the resource comprises a Document Object Model (DOM). In some examples, each locator of the plurality is associated with a weight value based on a type of the respective locator, and where the type of the respective locator corresponds to a process for generating the respective locator.

In an aspect, the multi-locator system includes a non-transitory computer-readable medium including one or more sequences of instructions, which, when executed by at least one processor, causes a plurality of actions. The actions include receiving, by at least one processor, a modified version of structure data including a description of a resource that includes at least one element. Each element can represent content of the resource in the structure data and where each element includes a portion of the structure data that defines the content. The actions include receiving, by the at least one processor, data specifying a target element of the structure data. The modified version of the structure data can include a modified version of the target element. The actions include obtaining, by the at least one processor, a plurality of locators for the target element. At least one of the locators of the plurality can be derived as a function of a frequency that each of one or both of attributes and classes of the target element appear in the structure data. The at least one locator can include a subset of one or both of the attributes and the classes. The subset can uniquely identify the target element in the structure data. The actions include applying the plurality of locators including the at least one locator to the modified version of the structure data to extract the modified version of the target element.

The details of one or more embodiments are set forth in the accompanying drawings and the description below. Other features and advantages will be apparent from the description and drawings, and from the claims.

DESCRIPTION OF DRAWINGS

FIG. 5 shows an example of application of the multiple locators of the multi-locator system.

DETAILED DESCRIPTION

The present disclosure describes a multi-locator system that is configured to identify a target element in a resource (e.g., a webpage or web application). Each locator of the plurality is configured to identify the target element in a different way from the other locators, even if the locators appear similar or identical to one another. More specifically, each locator uses a different process to select classes, attributes, position data, among other features, that is to be included in that locator. An advantage of using different locators with different processes for the same element is that the probability that the element can be still identified by some of the locators is enhanced even when the element is modified. In other words, varying the methodology of generating each locator of the multiple locators increases the robustness of the system and decreases the likelihood that all locators will fail simultaneously. Furthermore, locators that fail to identify the target element can be updated automatically by the system based on the identification of the modified version of the target element. By having the information of how the target element has been modified, the multi-locator system can correct locators that have failed, recalibrating them for the modified version of the resource. In turn, these modified locators can be used to help modify other locators that subsequently become stale and fail to identify the target element in the resource.

Figure 1:
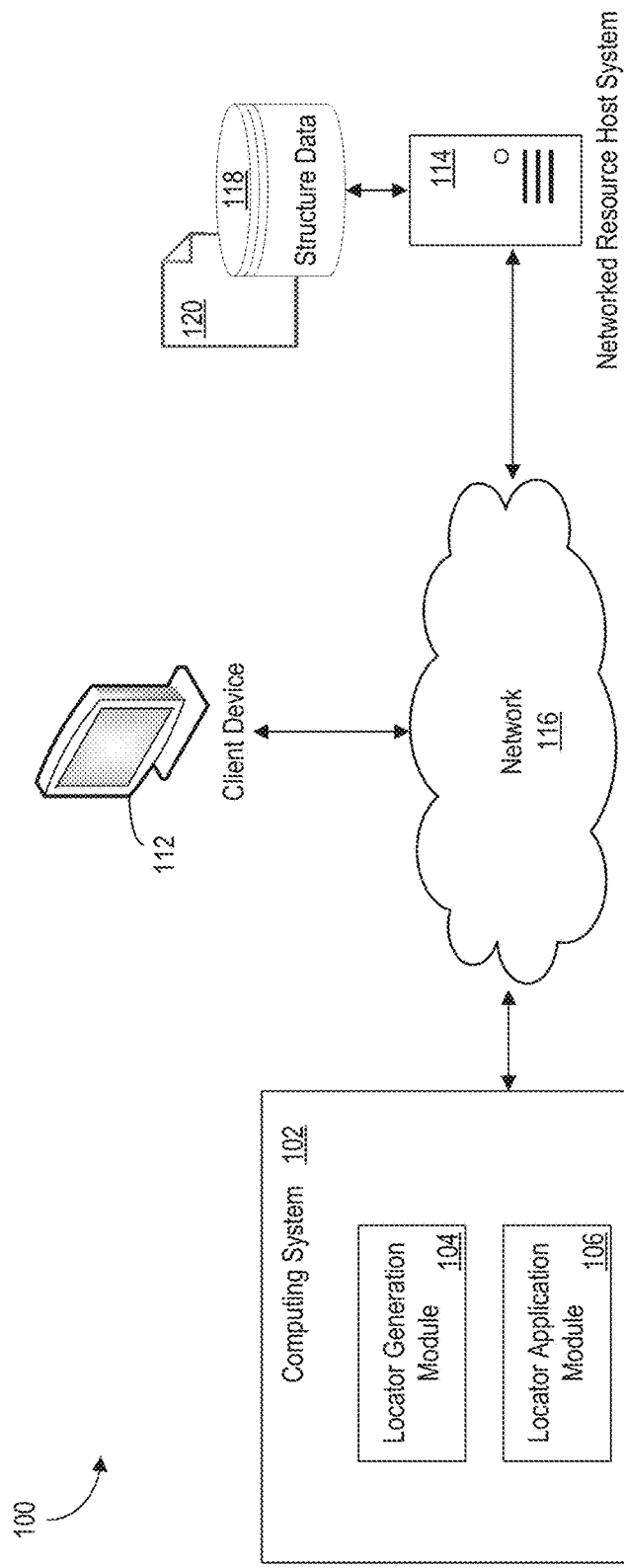
FIG. 1 is a diagram of an example computing environment for the multi-locator system for identifying one or more elements in a resource.

FIG. 1 is a diagram of an example computing environment 100 for the multi-locator system for identifying one or more elements in a resource. The computing environment 100 includes a computing system 102 configured to generate locators for identifying one or more elements in a networked resource 120 (e.g., a webpage). The computing environment 100 includes a client device 112 configured to access one or more resources from a host system 114 (e.g., a server of a content publisher) of the resource(s) 120. The client device 112 can access the host system 114 over a network 116 (e.g., the Internet). The host system 114 is configured to host the resource(s) 120 that can be accessed by the client device 112 and presented to a user by a user interface of the client device. The host system 114 stores the resource 120 by storing structure data 118 that defines the logical structure of the resource 120 and the means by which the resource is accessed and manipulated (e.g., rendered by the client device 112).

The computing system 102 includes a locator generation module 104 and a locator application module 106. The locator generation module 104 of the computing system 102 is configured to generate locators for tracking elements in resources 120. The locator application module 106 is configured to apply the locator(s) to the structure data 118 of a resource 120 to identify an element in the resource. The generated locators can be stored in a locators database as locators data 110.

A locator includes a mechanism for identifying an element in structure data 118 of a resource 120 (e.g., a webpage). Generally, the locator includes enough information to uniquely identify a particular element in the structure document. For example, if there are multiple instances of a type of element, the locator is configured to identify a particular instance. Here, an instance refers to a particular occurrence of the element in the structure data 118.

The locator can include a path of the element in the structure data 118 (e.g., an X-path). An X-path is a means for traversing the structure of the structure data 118 of the resource. For example, the locator can include an X-path of an attribute of the element, an X-path of a class of the element, of the entire X-path of the element including one or more attributes, elements, and/or parent classes and parent attributes of the element. In some implementations, the locator can include all tag names (e.g., div, span, button, etc.) and the position (e.g., HTML path name, etc.) of the element, and is referred to as the absolute X-path. In another example, the locator can include a minimum number of classes and/or attributes required to uniquely define the element in a present version of the structure data. For example, if the element is the only element including a particular class, such a locator can include a reference to that class. In another example, the locator can find the shortest unique path from the target element to find the shortest X-path that leads to the target element, (e.g., shortest in terms of number of direct parent classes, attributes, and tags used). The generated X-path can include classes, attributes, position, and tags, and uses the fewest portion of parent elements as possible, starting from the target and going up one by one. This can be called a Robula locator. In another example, the locator can include an X-path of one or more attributes of the element, and can be referred to as an attribute X-path locator. In some implementations the locator can include an X-path of one or more classes of the element, and can be referred to as a class X-path locator. While several specific examples of locators are discussed, this list is not exhaustive. For example, a locator can include a combination of classes and attributes. In another example, the locator can include an element ID (if one exists), text of the element (such as a title or content of the resource 120), link text, and/or CSS selectors.

The choice of the locator affects how robustly the locator can identify the element in the resource 120. For example, when the resource 120 is modified in some way (e.g., updated), the structure data 118 is changed. For example, if a locator includes a portion X-path to the element and that portion of the X-path changes in the modified structure data, the locator is unable to identify the element in structure data without additional context. The computing system 102 generally generates multiple locators for identifying the element in different ways. If a locator fails (e.g., identifies the wrong element or cannot identify a single element in the structure data), one or more of the remaining locators can still be able to identify the element. The choice of what is included in each of the locators and how the locators are generated by the computing system 102 is described in further detail below.

Generally, an element includes a portion of the structure data that represents a functional portion of the resource 120. An element can represent, in the structure data, a portion of the resource 120 that is rendered and displayed to by a user interface (not shown) of the client device 112. For example, the element can represent an interactive control, such as a button, slider, drop down menu, and so forth. An element can represent content of the resource, such as text, an image, headers, footers, etc. In this description, the content represented by the element of the structure data can be referred to as being the element, though elements, in some cases, include a reference to the content presented to the user rather than the content itself (e.g., images, video, etc.). For example, a graphic on a webpage can be referred to as an element, though the actual graphic is not expressly included in the element. In some implementations the content is included in the element. For example, a paragraph of text can be included in the element of the structure data 118. In addition to any content included in the element, the element generally includes syntax defining the class and/or attribute(s) of the element. The syntax of the element can include data type definitions, attribute types, class definitions, and values of the class and/or attributes of the element, and so forth. Examples of elements are described in reference to FIGS. 2A-5.

Generally, a resource 120 includes content that is available at a particular address or location and accessible by the client device 112. Resources can include webpages, web applications, documents, or any other content that can be accessed by the client device 112 and that is organized (e.g., for presentation on a user interface of the client device 112) by the structure data 118.

The structure data 118 includes data that is interpreted by the client device 112 (or other computing device) to generate the graphic representation of the resource 120. The structure data includes the elements described above. The structure data defines the relationships between the elements. For example, the structure data 118 can include a Document Object Model (DOM). The structure data can include hypertext markup language (HTML). The structure data can include cascading style sheets (CSS) which defines the classes (e.g., define the styles that are applied to those classes) of the HTML. Generally, the locators can include HTML attributes and/or CSS classes. However, the locators can include objects of the CSS.

The locator generation module 104 is configured to generate the locators of the multi-locator system. As described above, each locator includes a reference to at least a portion of the element that it is configured to identify. The reference can include a class of the element (e.g., a CSS class), an attribute of the element (e.g., an HTML attribute), an X-path of the element (e.g., a class X-path, an attribute X-path, an absolute X-path, etc.), or one or more parent classes and/or attributes of the element.

The locator generation module 104 is configured to determine which classes, attributes, etc. are to be included in the locator for an element. Generally, the locator includes classes, attributes, or other content that uniquely identifies the element in the structure data 118 and is unlikely to be changed as the resource 120 associated with the structure data 118 is updated. For example, if an attribute that is common in the structure data 118 is chosen, that attribute generally will not be a mechanism for differentiating the element from one or more other elements of the structure data 118. When a locator including such an attribute is applied to the structure data 118, it is likely that the locator may identify either the wrong element or be unable to identify the correct element.

Several types of locators can be generated by the locator generation module 104. For example, the computing system 102 can be configured to generate an attribute X-path locator, a class X-path locator, a Robula X-path locator, and/or an absolute X-path locator for identifying the element in the structure data 118. The locators can be generated according to the processes described below. Though several examples of locators are described, the computing system 102 is not limited to these particular example locators. These locators can be combined with other locators to find elements in the structure data 118 as a multi-locator system.

The locator generation module 104 is configured to generate locators based on a frequency in which classes and attributes of a target element appear in the structure data 118. A target element is an element that a given locator is configured to identify in the structure data 118 (e.g., the target of the locator). Generally, class or attribute can be selected by the locator generation module 104 for a locator when that class or attribute infrequently appears in the structure data 118. In other words, the ranking of classes and/or attributes for including in the X-path locator can be inversely proportional (or a similar such function) to the frequency in which the class or attribute appears in the structure data 118.

To generate a frequency-based X-path locator (either from classes or attribute of the element), the following process can be executed by the locator generation module 104. The locator generation module 104 is configured to analyze the structure data 118 (e.g., the HTML file of the resource 120) and identify each class or attribute that is included in the structure data 118. For an attribute-based locator, the attributes are extracted, and for a class-based locator, the classes are extracted. In some implementations a combination of both classes and attributes are extracted.

Once the list of attributes, classes, or both attributes and classes is determined, the locator generation module 104 determines each possible combination of the classes and/or attributes of the list. For example, if three classes are listed (e.g., big, red, blue), the locator generation module 104 finds all possible permutations of the three listed items. For example, the list of combinations can include the items big, red, blue, big red, big blue, red blue, and big red blue.

Once each possible combination of the list of classes and/or attributes is determined, the locator generation module 104 is configured to order the list of combinations of classes and/or attribute by frequency of occurrence of that combination in the structure data 118. The combinations associated with lower frequency values are generally ranked higher, and the combinations associated with higher frequency values are generally ranked lower. In some implementations the highest ranked combination is the combination of attributes and/or classes of the structure data 118 associated with the lowest frequency value.

The locator generation module 104 is configured to find a way to uniquely identify the target element or any of its parents. The locator generation module 104 analyzes the target element to determine which classes and/or attributes are included in the target element. For example, if generating an attribute X-path locator, the attributes of the target element are determined. The locator generation module 104 compares different combinations with the list of combinations generated from the entire structure data 118. If a combination of the target element is unique to the structure data 118, that combination is used to identify the element in the locator. If the locator generation module 104 determines that no combinations (e.g., of the attributes and/or classes) of the target element are unique to the structure data 118, the locator generation module analyzes the position of the combinations in the structure data 118. Here, the position of the target element refers to one or more parent attributes and/or classes of the target element.

The entire X-path need not be used to determine the position of the target element. Rather, if the parent attribute or class is uniquely combined with a combination of classes and/or attributes of the target element, the element can be uniquely identified. For example, if structure data 118 includes three instances of an element (e.g., three buttons) that include the same classes and attributes, no combination of the classes and/or attributes can uniquely define the element in the structure data 118. However, if one of the instances is positioned in a header of the resource 120 and if the others are not, the target element can be identified by its position in the header of the resource 120. The position of the target element in the structure data 118 is determined by iterating toward the top level of the structure data 118 from the target element. If the top level of the structure data 118 is reached, then the target element is defined as the n-th child of its parent by the locator generation module 104. If the target element is still not uniquely identified by the locator generation module 104, the module 104 iterates to the immediate parent of the target element and repeats the process. Thus, the locator generation module 104 has determined a combination of attributes and/or classes to uniquely identify the target element or a parent of the target element. If the target element is uniquely identifiable, the combination of attributes and/or classes that is determined to uniquely identify the target element is configured to be a locator and is stored in the locators database 110.

If a parent element of the target element is uniquely identifiable, but not the target element itself, the process is repeated for a portion the structure data 118 including the parent of the target element and its child elements only. This process is repeated until the target element is uniquely identifiable for at least a portion of the structure data 118. The target element can then be identified with a multi-step process when applying the locator to the structure data 118. This multi-step process includes first identifying the parent element (which is uniquely identifiable in the structure data 118). Second, the first target child element is identified, which can be a parent of the target element or the target element itself, and which is uniquely identifiable in the sub-portion of the structure data 118 (but not the entirety of the structure data 118). If further child target elements are included, they are iteratively identified until the target element is reached in the structure data 118. An example is presented for illustrative purposes. The following includes an example of structure data 118. The locator generation module 104 is configured, in this example, to generate a class-based locator. This can be called a class X-path locator. The target element (for which the locator is being generated) is bolded.

```
<html>
    <body>
        <div class= "small blue red">
            <div class= "big red"></div>
        </div>
        <div class= "small blue red">
            <div class= "big red">
                <span></span>
            </div>
        </body>
</html>
```

The target element <span></span> includes no classes, and so cannot include any unique combination of classes in the structure data 118. Neither is the position of the class combinations unique, because there are no classes included in the target element. Because this element is not a top-level element of the structure data 118, the locator generation module 104 iterates up to the parent of the target element, which is the element <div class="big red">.

The parent of the target element includes classes big and red. Because none of big, red, or big red are unique, the locator generation module 104 cannot use the combination as the unique identifier for the locator. However, the parent of the target element does include the second instance of the big class. Incidentally, the parent of the target element also includes the fourth instance of the red class, but because big is less frequent, it is chosen for the locator. The locator generated is //*[@class="big"])[2]/span, which is the span direct child of the second big element of the page.

The example locators are provided for illustrative purposes, and can include additional information in practical application. For example, the locator described above as including //*[@class="big"])[2]/span is generated by the multi-locator system, and additional information may be appended to the generated locator to conform with the particular platform for which the locator is being generated. For example, a syntactically complete version of the foregoing locator can include the following string: /descendant::*[contains(concat(",normalize-space(@class),"), ".big")][2]/*[local-name( )="span"]. This is true for locators described throughout this disclosure.

While classes are used in the above example, the attribute(s) of the target element can be used instead, or a combination of attributes and classes of the target element. The locator generation module 104 generates several locators for the target element so that if one fails (e.g., because an attribute or class of the target element has been changed), the remaining locators are still capable of identifying the target element in the structure data 118.

Other examples of locators are possible. For example, the Robula X-path locator finds the shortest X-path in terms of the parent of the structure data 118 that uniquely identifies an element of the structure data 118. For example, in addition to attributes and classes, tags (e.g., span and div tags) can be included to identify the element. In another example, contextual clues can be used to identify the target element. Specifically, additional data can be used that provides context to the attributes and classes of the element. For example, a particular combination of classes and attributes in structure data 118 may be indicative of a commonly used element.

The locator application module 106 is configured to apply the locators generated by the locator generation module 104 to the structure data 118 to identify a target element from the structure data 118. Generally, the locator application module 106 applies locators to a modified version of the structure data 118 to find a modified version of the target element. However, the locator application module 106 can apply the locator to an unmodified version of the structure data 118 as well.

The locator application module 106 can be configured to apply the locators to the structure data 118 in response to a request from a computing system, such as the client device 112. For example, an application of the client device 112 may need to determine whether a particular button of a webpage or web application (e.g., resource 120) has been activated. However, the application may have trouble identifying which element is the button once the webpage or web application has been updated by the publisher of the webpage or web application. The application can send a request to the computing system 102 to cause the locator application module 106 to apply the locators for that target element to the modified structure data 118 of the modified resource 120. In such cases, the locator application module 106 can be a part of the application that is being executed by the client device 112. It need not be executed on a remote computing system 102. In some implementations, the request is sent over the network 116 to the computing system 102, and the computing system 102 is configured to determine the results before sending a response to the client device 112. In this case, the computing system 102 accesses the resource 120 directly and applies the locators by the locator application module 106. The locator application module 106 can apply the locators to the modified version of the structure data 118 to find the target element and return the portion of the structure data 118 including the target element to the client device 112 for display to the user or for one or more other applications (e.g., updating the requesting application with the modified target element, etc.).

The locator application module 106 can apply multiple locators to the structure data 118 and determine the target element of the structure data 118 based on the multiple locators. Each locator of the multi-locator system is weighted by the computing system 102. The weights of the locators can be determined based on training data 108 stored and/or provided by the computing system 102. The training data 108 can include data representing manual identification of an element in a resource 120 that is modified over time. For example, a user can click on the element as the resource 120 is updated to provide an indication of how the resource 120 is changed over time. Locators that are more accurate at finding the target element in the modified version of the resource 120 can be weighted more heavily than less-accurate locators. In some implementations, the training data 108 can include simulated changes to a resource 120 and the target element of the resource. The weights can be generated based on the accuracy of the locators applied to the simulated resource 120. Generally, the values of the weights are determined when the locators are generated. In some implementations, the weights can be updated over time. In some implementations, the weights are generated for particular locators. In some implementations the weights are generated for each locator type (e.g., class X-path, attribute X-path, etc.), and are applied to each locator of that locator type regardless of the particular classes and/or attributes of the locator.

The locator application module 106 applies the multiple locators to the structure data 118 using a voting system. Each locator that finds an element applies a vote for that element as being the target element. The value of a vote is adjusted according to the weight associated with the locator. The element receiving the largest vote total is determined to be the target element. An illustrative example of the voting system is described in relation to FIG. 5.

The locators data 110 can be stored in a database of the computing system 102. When the computing system 102 receives a request to find a target element in structure data 118, the locators corresponding to that structure data 118 are retrieved from the database and applied to the structure data 118. In some implementations, the locators data 110 are stored at the client device 112. For example, the locators can be generated and stored locally to the client device 112 in response to a user indicating that an element of a resource 120 should be a target element.

Similarly, the training data 108 can be stored at the computing system 102 in a database. When the locators of the computing system 102 are weighted, the training data 108 can be retrieved and used to generate the weights of the locators.

As described above, the host system 114 is communicatively connected to the client device 112 and the computing system 102 through a network 116. The host system 114 can include, but are not limited to, e.g., one or more server computers. The host system 114 can be configured to transmit, receive, and/or process data. For instance, in some cases, the host system 114 can be a web server configured to receive and store content (e.g., web content, such as a web page), and make the content available to one or more other computer systems (e.g., client device 112). Upon receiving a request (e.g., from the client device 112), the host system 114 can retrieve the requested content (e.g., resource 120 and its structure data 118), and transmit the content to the requesting computer system to fulfill the request. In some cases, the host system 114 can be owned, operated, and/or maintained by parties different from those that own, operate, and/or maintain the computing system 102.

The computing system 102 is also communicatively connected to one or more client devices 112 through the network 116. Each client device 112 includes a respective user interface (e.g., shown in FIGS. 2A-3B). Users can interact with the user interface to view content of the resource 120. Users can also interact with the user interface to transmit data to other devices (e.g., to the computing system 102 and the host system 114). Users can interact with the user interface to issue commands (e.g., to the computing system 102, and to the host system 114). In some implementations, a user can install a software application onto a client device 112 in order to facilitate performance of these tasks.

The computing system 102 can be a portion of the client device 112. The locator generation module 104 and/or the locator application module 106 can one or both be executed by the client device 112. For example, the logic of the locator application module 106 and/or locator generation module 104 can be executed as an application installed on the client device 112. The logic of one or both of the locator application module 106 and locator generation module 104 can be executed either before the client device 112 accesses a resource 120 or after accessing the resource (e.g., in response to receiving the resource).

The client device 112 can be any electronic device that is used by a user to view, process, transmit and receive data. Examples of the client device 112 include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 116. The client device 112 can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, the client device 112 need not be located locally with respect to the rest of the environment 100, and can be located in one or more remote physical locations.

The network 116 can be any communications network through which data can be transferred and shared. For example, the network 116 can be a local area network (LAN) or a wide-area network (WAN), such as the Internet. The network 116 can be implemented using various networking interfaces, for instance wireless networking interfaces (such as Wi-Fi, Bluetooth, or infrared) or wired networking interfaces (such as Ethernet or serial connection). The network 116 also can include combinations of more than one network, and can be implemented using one or more networking interfaces.

The computing system 102 and the host system 114 are each illustrated as a respective single component. However, in practice, each can be implemented on one or more computing devices. A computing system 102 or a host system 114 can be, for instance, a single computing device that is connected to the network 116. In some implementations, a computing system 102 or host system 114 can include multiple computing devices that are connected to the network 116. For instance, the computing system 102 can include several computing devices, and the locator generation module 104 and the locator application module 106 can be distributive on one or more of these computing devices. In some implementations, a computing system 102 or a host system 114 need not be located locally to the rest of the environment 100, and portions of the computing system 102 or host system 114 can be can be located in one or more remote physical locations.

Figure 2A:
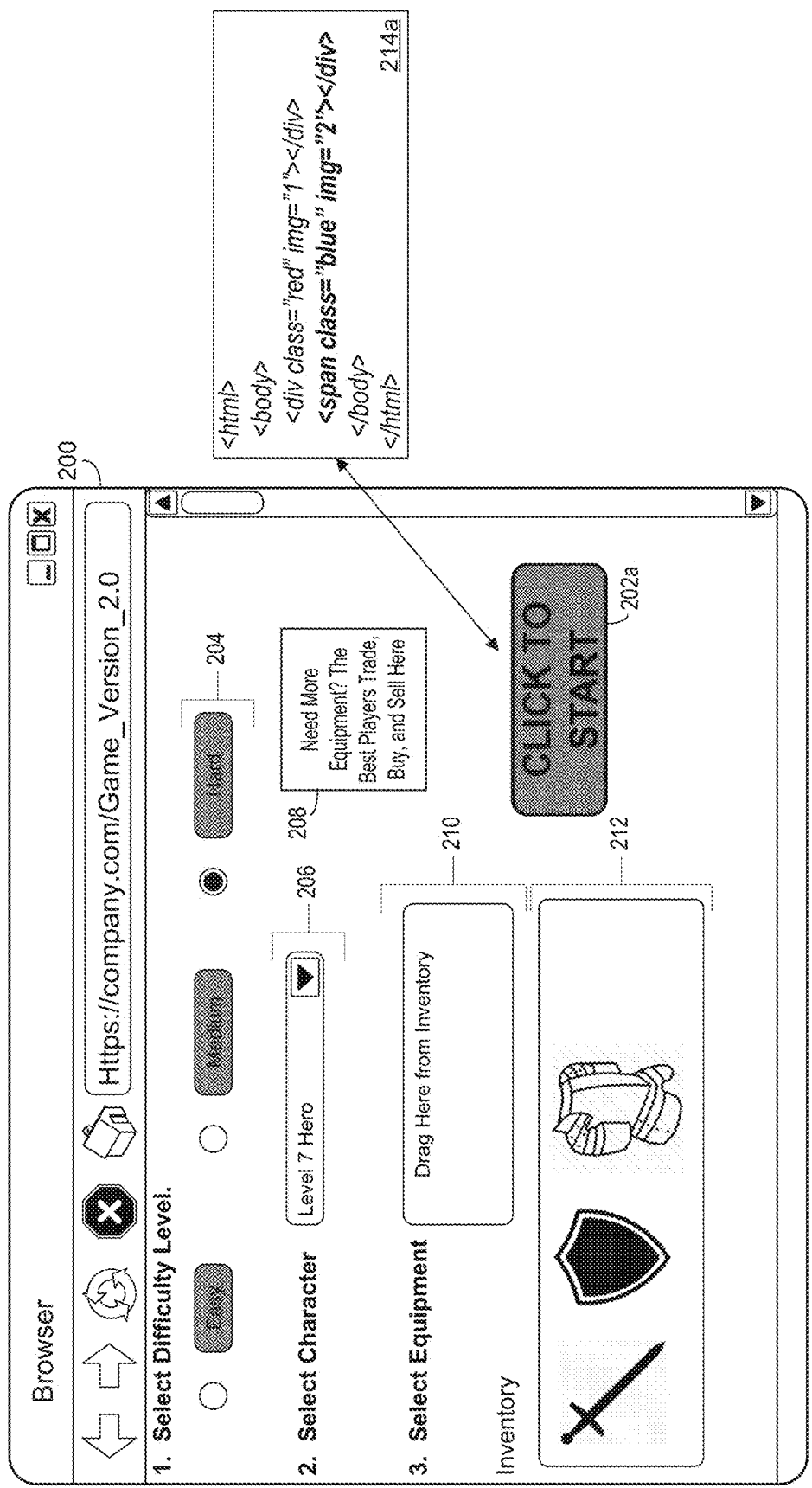
FIG. 2A shows an example of a resource and an element of the resource.

Turning to FIG. 2A, an example screenshot 200 of a resource (e.g., resource 120 of FIG. 1) and an element of the resource is shown. The screenshot 200 includes a depiction of a web browser window. Here, the browser is at the address of a web application that includes an interactive game. The game version is shown as being 2.0.

The web application page that is being shown in the screenshot 200 includes several different elements that are being presented to a viewer of the web application as content of the application. For example, the web application page includes radio buttons 204 for selecting a game difficulty. The page includes a drop-down menu 206 for selecting a character. The page includes a content slot 208 for displaying a message and a link to another resource. The page includes a region 210 for dragging and dropping inventory items, and icons 212 displaying the inventory items themselves. Each of these are represented in the structure data (e.g., structure data 118) of the page as different elements of the page. Last, a "click to start" button 202a is displayed that allows the user to initiate the game.

The computing system 102 can receive data including an indication that the button 202a should be a target element. The data can be received from a user (e.g., by an interface of the client device 112), by an application installed in the browser (e.g., a plugin), etc. For example, a third party publisher (e.g., an advertiser) might wish to determine how often a particular element is clicked in a webpage. The plugin of the third party publisher can be configured to identify target elements on behalf of the third party publisher.

Once the target element (e.g., button 202*a*) is identified, the computing system 102 generates locators for the target element. The structure data 214*a* associated with the button 202*a* is shown, and the portion of the target element in the structure data 214*a* is bolded. Here, the structure data 214*a* includes HTML.

An example of generating multiple locators for the structure data 214*a* is described. The structure data 214*a* includes the following:

```
<html>
    <body>
        <div class= "red" img= "1"></div>
        <span class="blue" img="2"></span>
    </body>
</html>
```

The button 202*a* is represented by the target element <span class="blue" img="2"></div>. The following locators are generated by the locator generation module 104. An absolute X-path locator includes /html/body/span[2] because this is always full path of the element. An attributes X-path locator includes //*[@img="2"] because this includes a unique attribute name and attribute value pair. The class X-path locator includes //*[@class="blue"] because this includes a unique class. The Robula X-path locator includes //span because span is only present once in the structure data 118. In this example, four locators are generated, but other numbers (e.g., fewer or greater) can be generated for the target element.

Figure 2B:
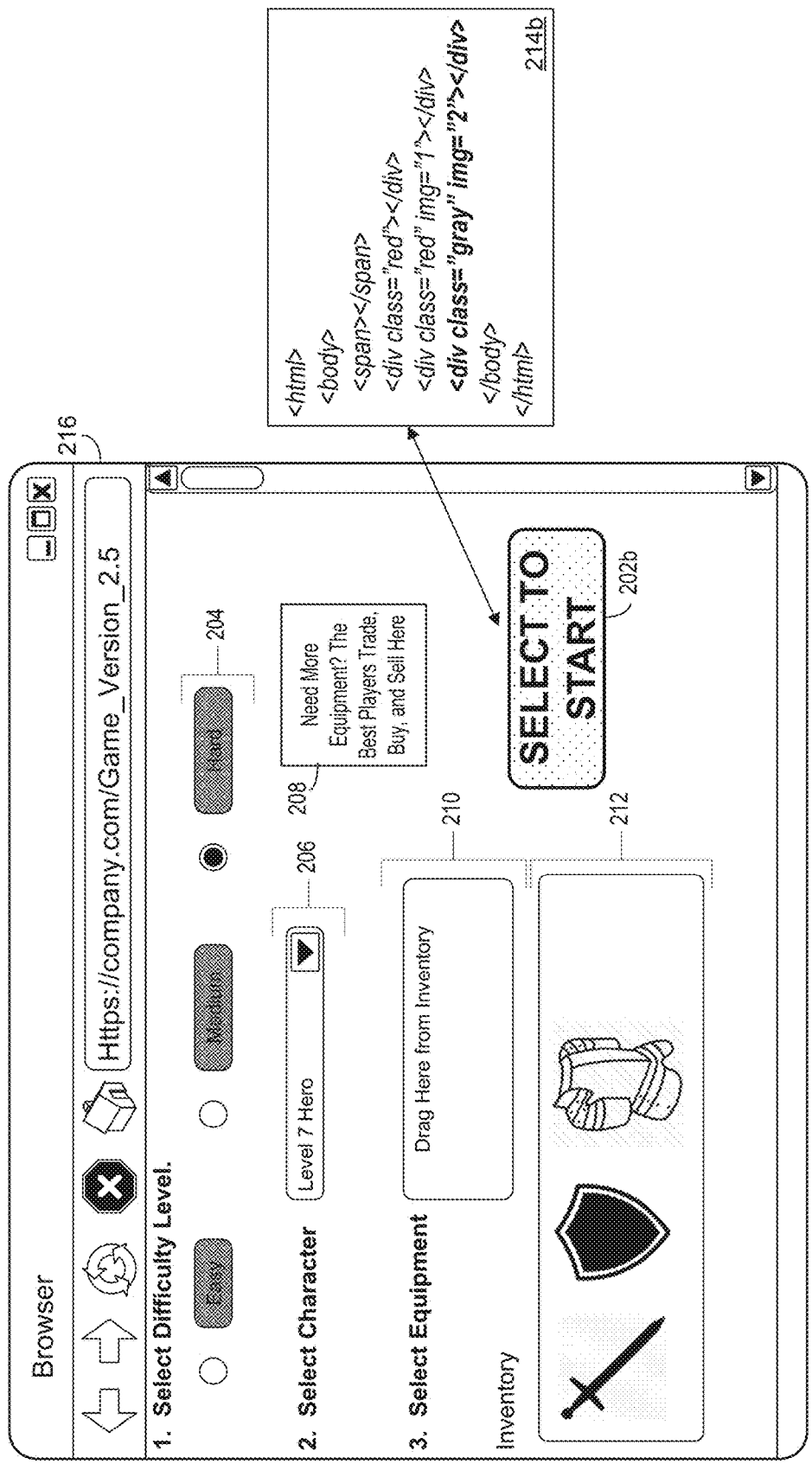
FIG. 2B shows an example of a modified version of the resource of FIG. 2A including a modified version of the element of FIG. 2A.

Turning to FIG. 2B, an example screenshot 216 is shown including of a modified version of the resource of FIG. 2A including a modified version of the target element of FIG. 2A. The updated resource includes a new version of the game, which is version 2.5. In this version, elements 204, 206, 208, 210, and 212 remain unchanged. However, target element 202*a* has been updated to be element 202*b*. For example, the color, size, and text of the button 202*b* differ from the button 202*a*. The computing system 102 is configured to identify the element corresponding to the button 202*b* with the locators generated for the button 202*a*, even though the button 202*b* is a modified version of the button 202*a*. As the button 202*b* is a modified version of the button 202*a*, the structure data 214*a* is also modified to cause the button 202*b* to render differently, and is shown as modified structure data 214*b*.

An example of finding the modified version of the target element is described. The modified structure data 214*b* is shown below:

```
<html>
    <body>
        <span></span>
        <div class= "red" img= "1"></div>
        <div class="gray" img="2"></div>
        <div class= "blue"></div>
    </body>
</html>
```

The modified version of the target element is >div class="gray" img="2"></div>, which is modified from the structure data 214*a* which included the target element <span class="blue" img="2"></div>. Each locator is applied to the modified version of the structure data 214*b*. The absolute X-path locator /html/body/div[2] returns the element <div class="gray" img="2"></div>, which is the target element. The attributes X-path locator //*[@img="2"] returns the element <div class="gray" img="2"></div>, which is the target element. The class X-path locator //*[@class="blue"] returns >div class="blue"></div> , which is not the target element. The Robula X-path locator //span returns <span>, which is not the target element. Three different elements have been found. In this example, the attributes X-path locator and the absolute X-path locator weights together exceed the weights of the other locators, and the target element is correctly identified.

Figure 3A:
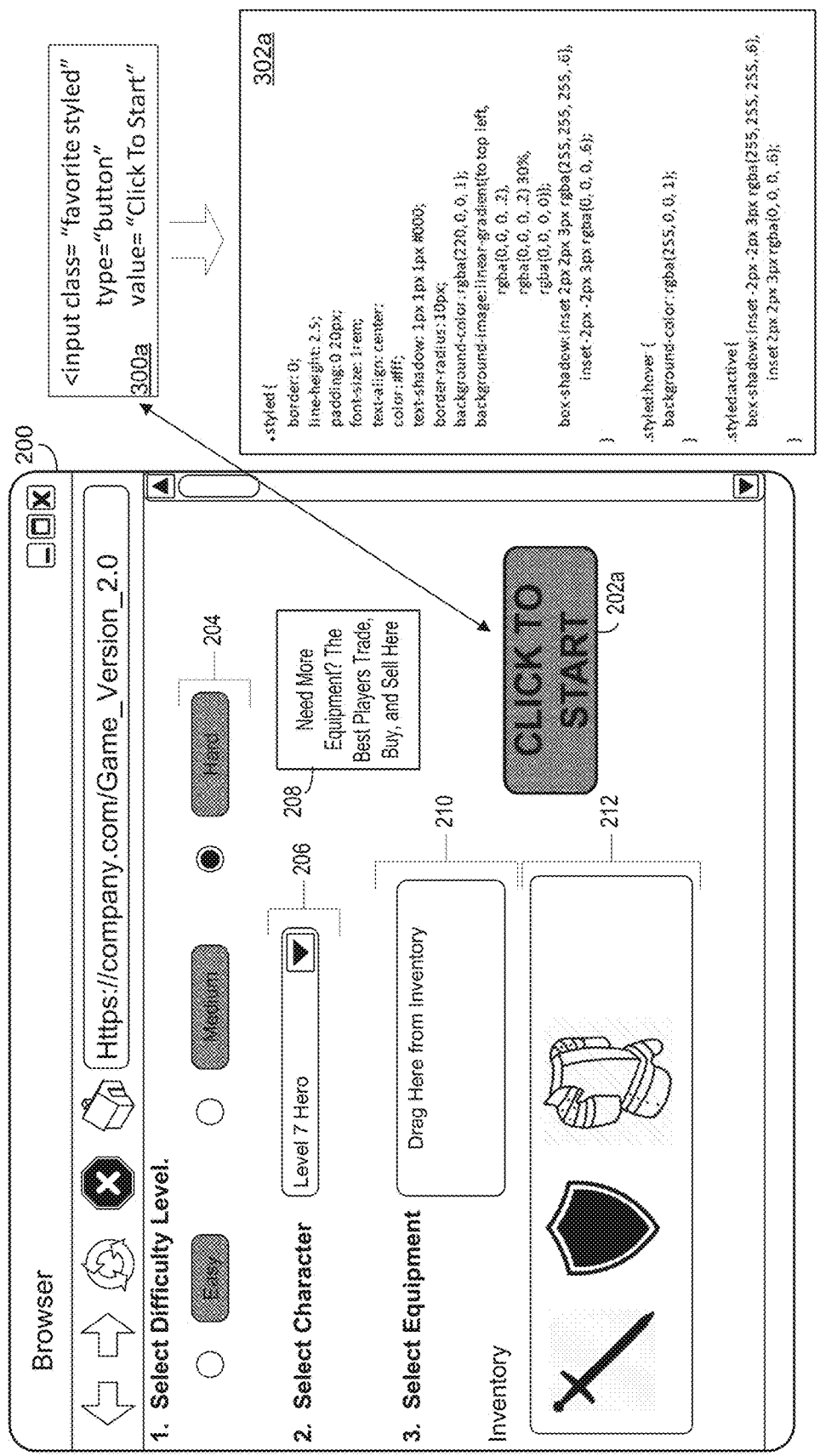
FIG. 3A shows an example of a resource and an element of the resource.
Figure 3B:
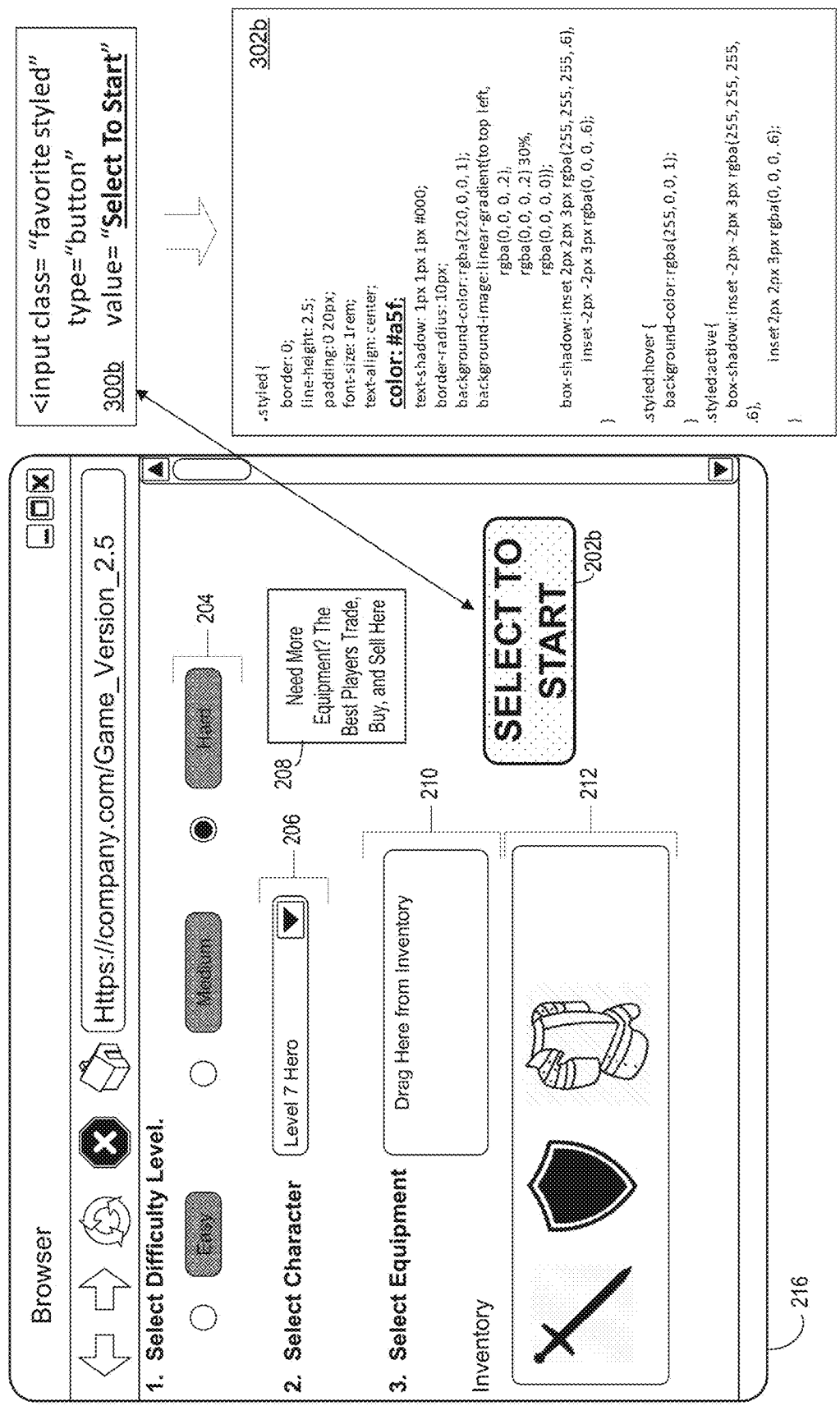
FIG. 3B shows an example of a modified version of the resource of FIG. 3A including a modified version of the element of FIG. 3A.

Rather than parsing HTML for the target element, as described in relation to FIGS. 2A-2B, the computing system 102 can use CSS classes and attributes either in place of or in addition to the techniques described above. Turning to FIGS. 3A-3B, an alternative example of applying locators to the resource of the screenshots 200, 216 is shown. Here, the same screenshots 200, 216 represent the application versions 2.0 and 2.5, respectively. However, the structure data 214*a*, 214*b*, which includes HTML, is replaced with CSS of 302*a*, 302*b*.

In FIG. 3A, the button 202*a*, which corresponds to the target element, is defined as shown by object 300*a*. The corresponding CSS attributes are shown in box 302*a*. When the button is updated to button 202*b* as shown in FIG. 3B, the object 300*a* is updated to object 300*b*, and the corresponding CSS 302*a* is updated to CSS 302*b*. In this example, the color #fff is changed to #a5f, and the text "click to start" is changed to "select to start." The target element can be identified in spite of these differences based on other attributes in the CSS 302*a* that do not change in CSS 302*b*, such as the padding, box shadow, border radius, etc.

Figure 4:
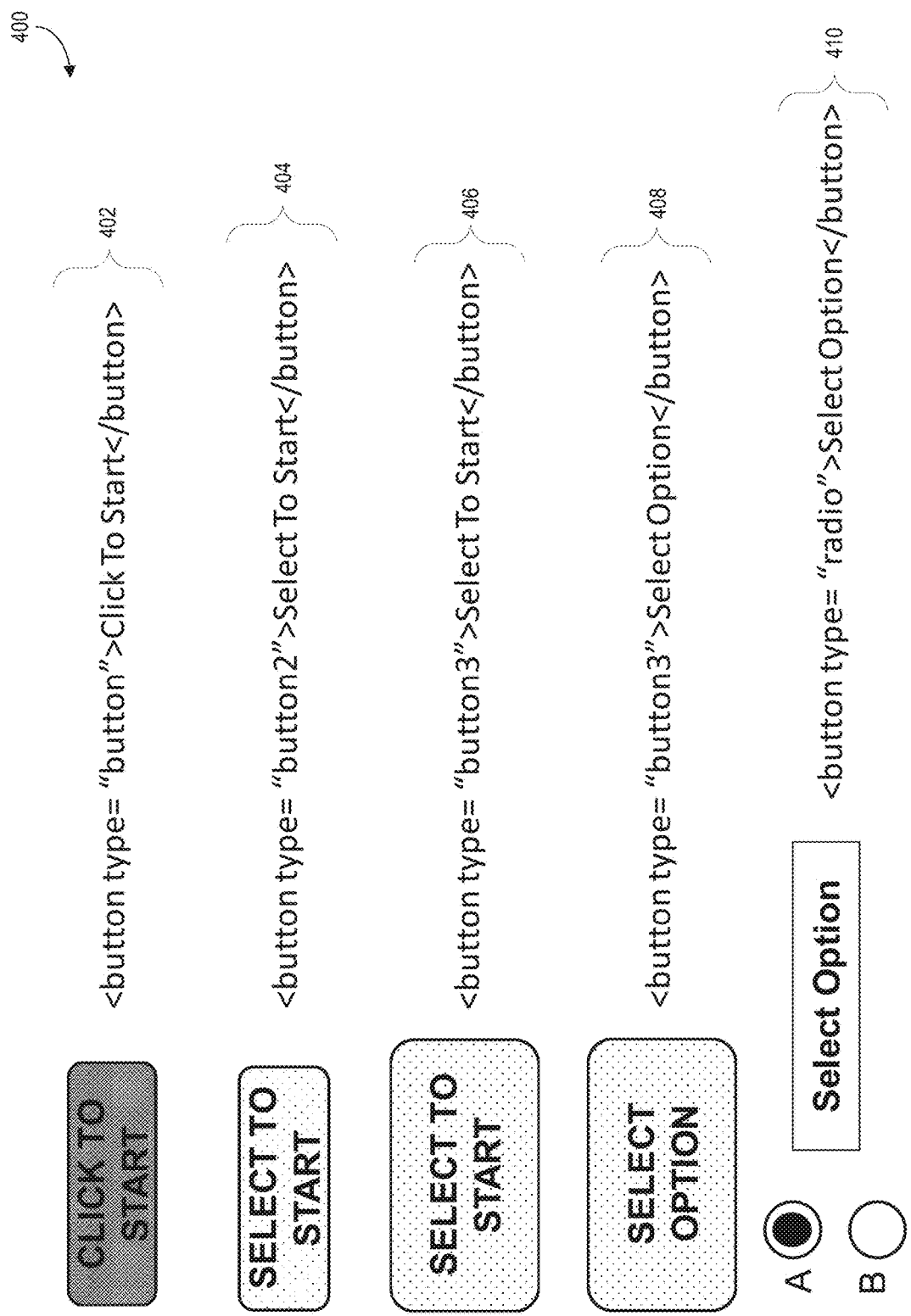
FIG. 4 shows examples of an element that is modified over several iterations.

FIG. 4 shows an example of training data 400 including examples of an element that is modified over several iterations of a resource (e.g., resource 120). The first version of the element 402 is defined with text "click to start" and a class of button. When the resource is updated, the element 402 is updated to element 404, having the class button2 and the text "select to start." The element 406 is updated to include the class button3, and the size is changed. The element 408 is updated to include class button3 and text "select option." The element 410 can be updated to include class radio. The training data 400 can include actual iterations of a resource that have been updated or simulated modifications to a resource including changes to the target element. The weights of the locators can be based on how likely they are to successfully identify the element as it progresses through updates 402, 404, 406, 408, and 410.

FIG. 5 shows an example of application of the multiple locators of the multi-locator system. For purposes of illustration, the locators 502*a*-502*d* (collectively, locators 502) of the multi-locator system are the same as the locators generated in the example described in relation to FIGS. 2A-2B. Each locator 502*a*, 502*b*, 502*c*, 502*d* is assigned a respective weight 504*a*, 504*b*, 504*c*, 504*d* (collectively, weights 504). The values for each of the weights 504 are determined based on the training data 108. As previously described, the weights 504 can be determined for each particular locator 504*a-d* or for a type of locator (e.g., class X-path).

When the computing system 102 applies the locators 502 to the resource 120, each of the locators identifies a respective element from the structure data 510 as being the target element 520. In this example, the identified elements 506a, 506b, 506c, 506d (also called votes 506) are weighted by the weights 504 to determine which element is the target element. The element with the highest score 518 is identified as the target element. In this example, element A 512 receives a score 518 of 2 from locator 502a, element B 514 receives a score of 7 from locators 502b, 502c, and element C 516 receives a score of 0. The structure data 510 shows the target element 520 in bold.

In this example, locators 502a and 502d failed to select the correct element from the structure data 510 as being the target element 520. The locators 502a, 502d can be updated by the locator generation module 104 by using the modified version of the structure data 520. For example, the updated locators 508a, 508b (also called updated locators 508) are generated from the modified version of the structure data 520. For example, class X-path locator 502a is updated from //[@class="blue"] to updated locator 508a that includes //[@class="gray"], updating the class from blue to gray. Similarly, Robula X-path locator 502d including //span is updated to updated locator 508b including //img="2". Because locators 502b, 502c identified the winning element as the target element, the locators 502b, 502c are not updated.

Generally, the multi-locator system can be used in addition to other mechanisms. In some examples, the multi-locator system is used inside an end-to-end (E2E) test, an automated series of click on elements of a webpage, to test that the webpage works well. Inside this test, the system can generate assertions, such as a question whether the text "Sign Up" is present on the resource 120. If the assertion fails, the whole test fails, and the system can determine that that either the resource 120 is broken (e.g., cannot be retrieved properly) or that the multi-locator system did not successfully identify the element. In contrast, if all the assertions succeed, it is likely that the multi-locator system found the elements in the resource 120, and the locators can be updated in response to this determination, accordingly.

While four locators are shown in this example, the number of locators can be different. For example, 2, 3, 5, 6, or more locators can be used to identify the target element. Each locator of the plurality is configured to identify the target element in a different way from the other locators, even if the locators appear similar or identical to one another. More specifically, each locator uses a different process to select classes, attributes, position data, etc. that is to be included in that locator. The advantage of generating different locators with different processes for the same element is that the element can be identified by some of the locators even when the element is modified.

Figure 6:
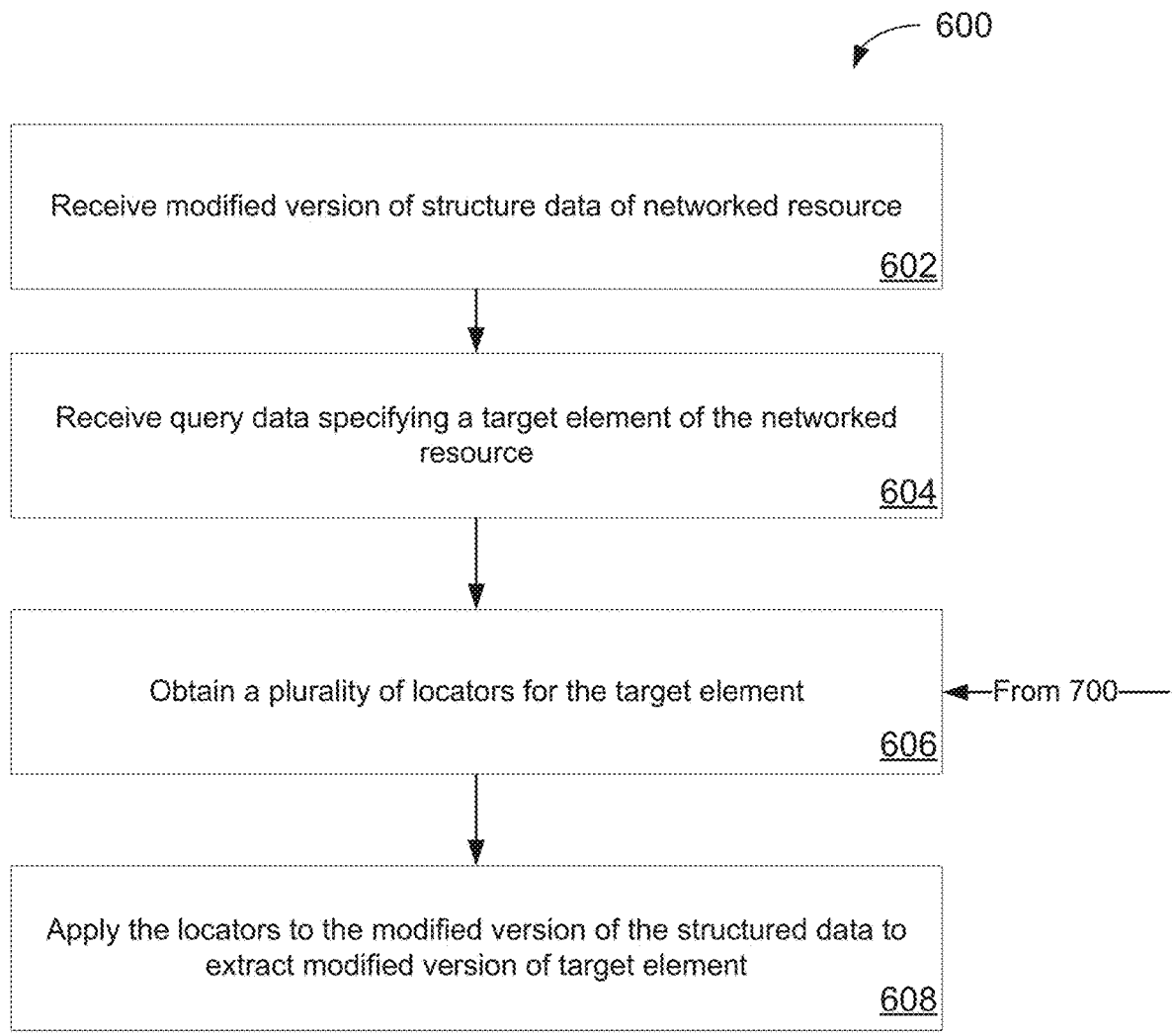
FIGS. 6-8 show example processes for identifying an element in a resource.
Figure 7:
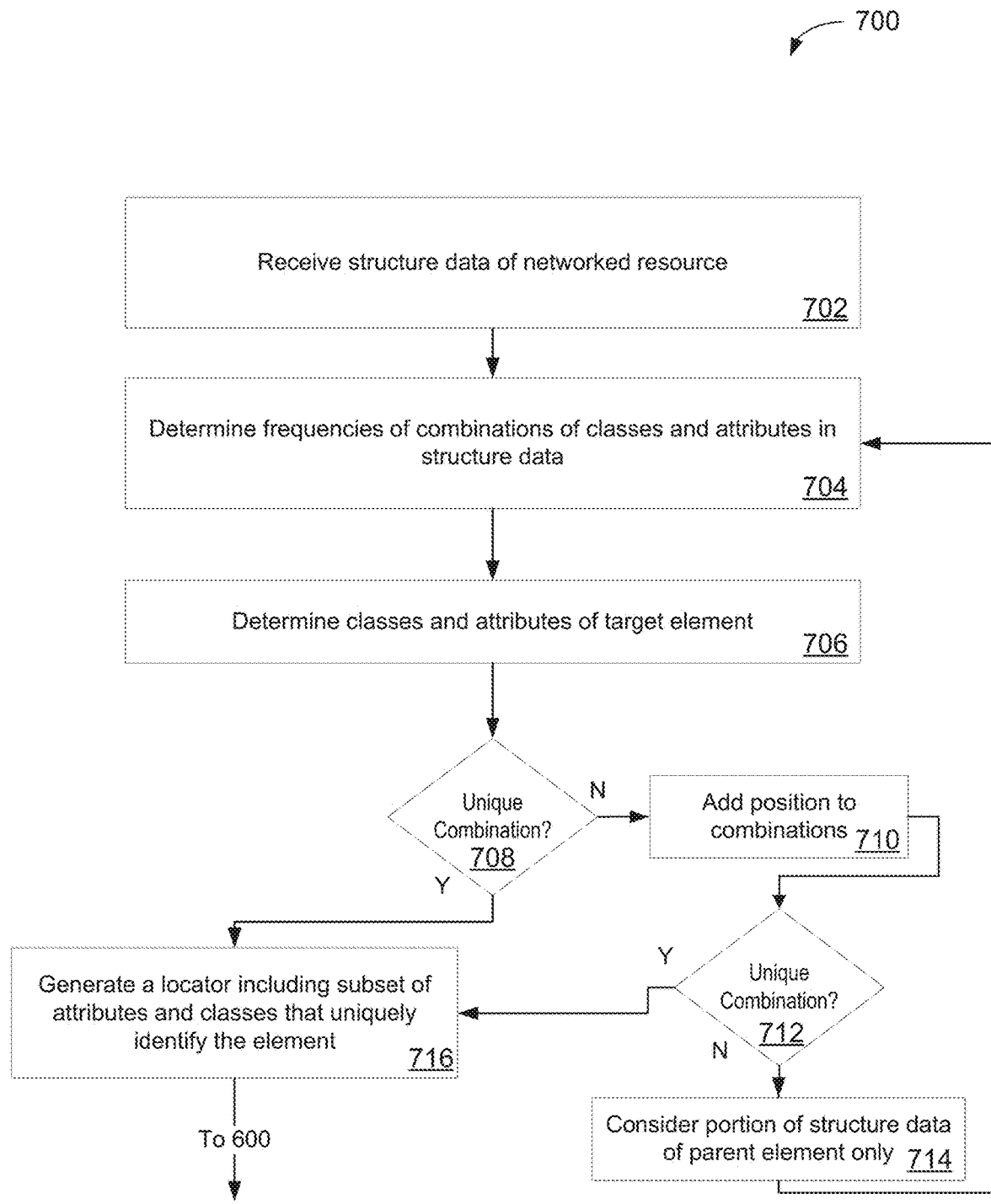
Figure 8:
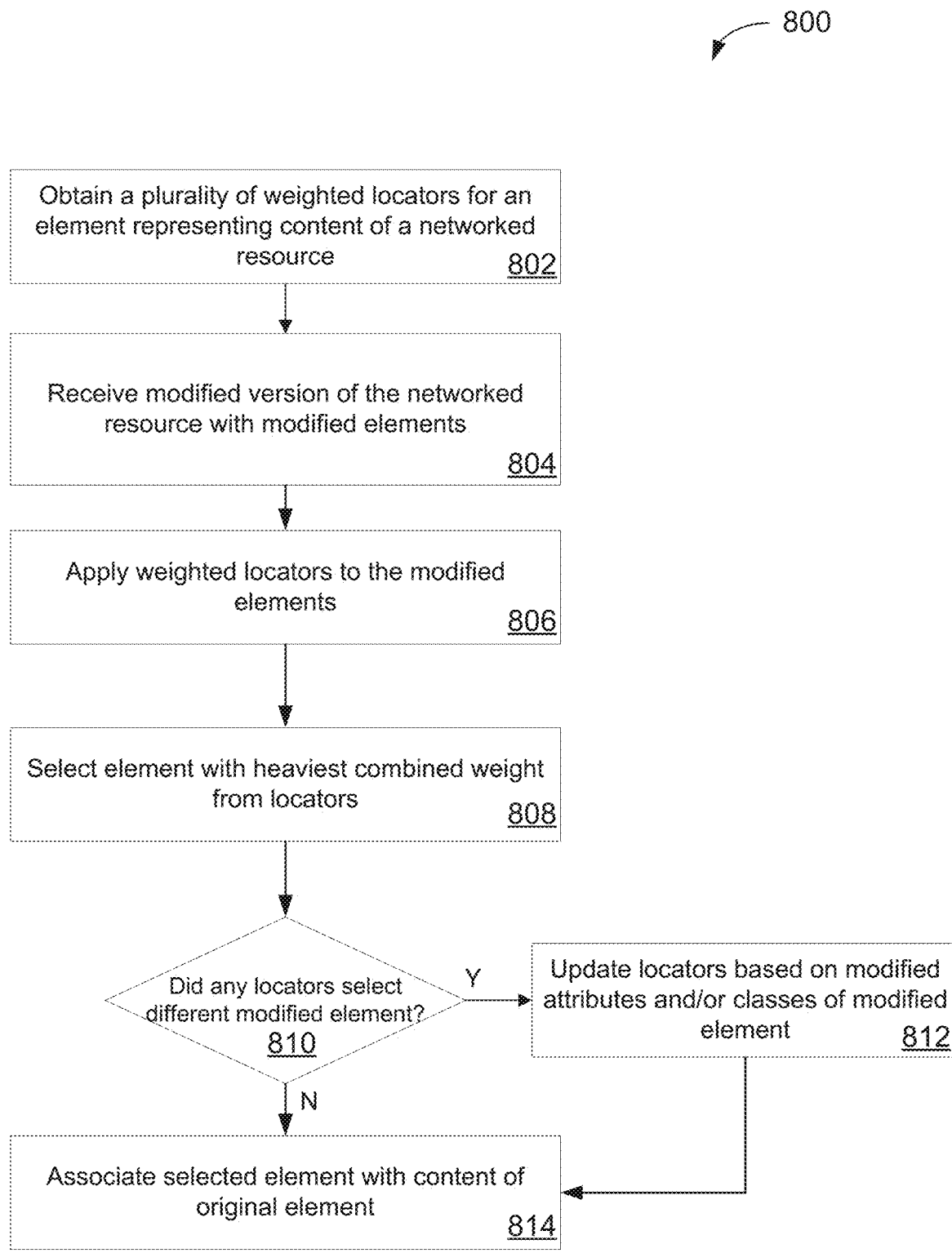

FIGS. 6-8 show example processes for identifying an element in a resource. FIG. 6 shows an example process 600 for identifying an element by a multi-locator system. The process 600 can be executed, for example, by computing system 102 described in relation to FIG. 1. The computing system 102 is configured to receive (602) a modified version of structure data (e.g., structure data 118) of a resource (e.g., resource 120). The resource 120 can be received in response to the computing system 102 receiving a request (e.g., from the client device 112) to find a target element of the resource 120.

The computing system 102 is configured to receive (604) data indicating the target element as being the target element for identification. The data can include a query for the element, a flag or key representing the element in a lookup table, or some other means of communicating to the computing system 102 that the element to be identified is the target element. In some implementations, the data can simply point to a resource 120, which is known to include the target element.

Once the element that is to be targeted is determined, the computing system 102 obtains (606) the plurality of locators from the locators data 110 that correspond to the target element. Generally, the locators have been generated as described previously, and are each configured to identify the target element in a different way.

The computing system 102 applies (608) the locators to the modified version of the structure data 118 to extract the modified version of the target element. As stated previously, because multiple locators are used that find the target element in different ways, the computing system 102 can correct locators that fail and the computing system can still find the target element, even when the target element is modified.

FIG. 7 shows an example process 700 for generating locators of a multi-locator system. The process 700 can be executed, for example, by computing system 102 described in relation to FIG. 1. The computing system 102 receives (702) the structure data (e.g., structure data 118) of a resource (e.g., resource 120). The computing system 102 determines (704) frequencies of each combination of the classes and attributes of the structure data 118. The computing system 102 determines (706) the classes and attributes of the target element. If the computing system 102 determines (708) that a unique combination of attributes and/or classes is included in the target element, the computing system 102 generates (716) a locator with the combination of classes and/or attributes. If the computing system 102 determines (708) that there is no unique combination of the classes and/or attributes included in the element, the computing system 102 adds (710) position information to the combinations included in the target element. For example, the computing system 102 includes tags or other position information from parent elements, such as parent classes and/or parent attributes. The computing system 102 determines (712) whether a unique combination can be found this way. If not the computing system 102 repeats the process, considering (714) only a portion of the structure data 118 including the first patent element of the target element. This process iterates until unique identifying elements and/or attributes can be found to be included in the locator. This process 700 is described in detail in relation to FIG. 1, and can be used to generate the class X-path locator and/or the attribute X-path locator for a target element. Once the locator is generated according to process 700, the locator can be applied to structure data 118 as described in process 600.

FIG. 8 shows an example process 800 for identifying an element by a multi-locator system. The process 800 can be executed, for example, by computing system 102 described in relation to FIG. 1. The computing system 102 obtains (802) a plurality of weighted locators for an element representing content of a resource. The computing system 102 receives (804) a modified version of the resource with modified elements. The computing system 102 applies (806) the weighted locators to the modified elements. The computing system 102 selects (808) the element corresponding to the heaviest combined weight from locators. The computing system 102 determines (810) whether any locators selected a different element than the identified target element. The computing system 102 updates (812) the failed locators based on the modified attributes and/or modified classes of modified element of the modified structure data 118. Once the locators have been updated (if applicable) the selected element is identified as the target element and can be associated (814) with the content in the resource 120 of the original element.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the computing system 102, the client device 112, and the host system 114 can be implemented using digital electronic circuitry, or in computer software, firmware, or hardware, or in combinations of one or more of them. In another example, the processes 600, 700, 800 can be implemented using digital electronic circuitry, or in computer software, firmware, or hardware, or in combinations of one or more of them.

Some implementations described in this specification (e.g., the locator generation module 104, the locator application module 106, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the locator generation module 104 and/or the locator application module 106 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
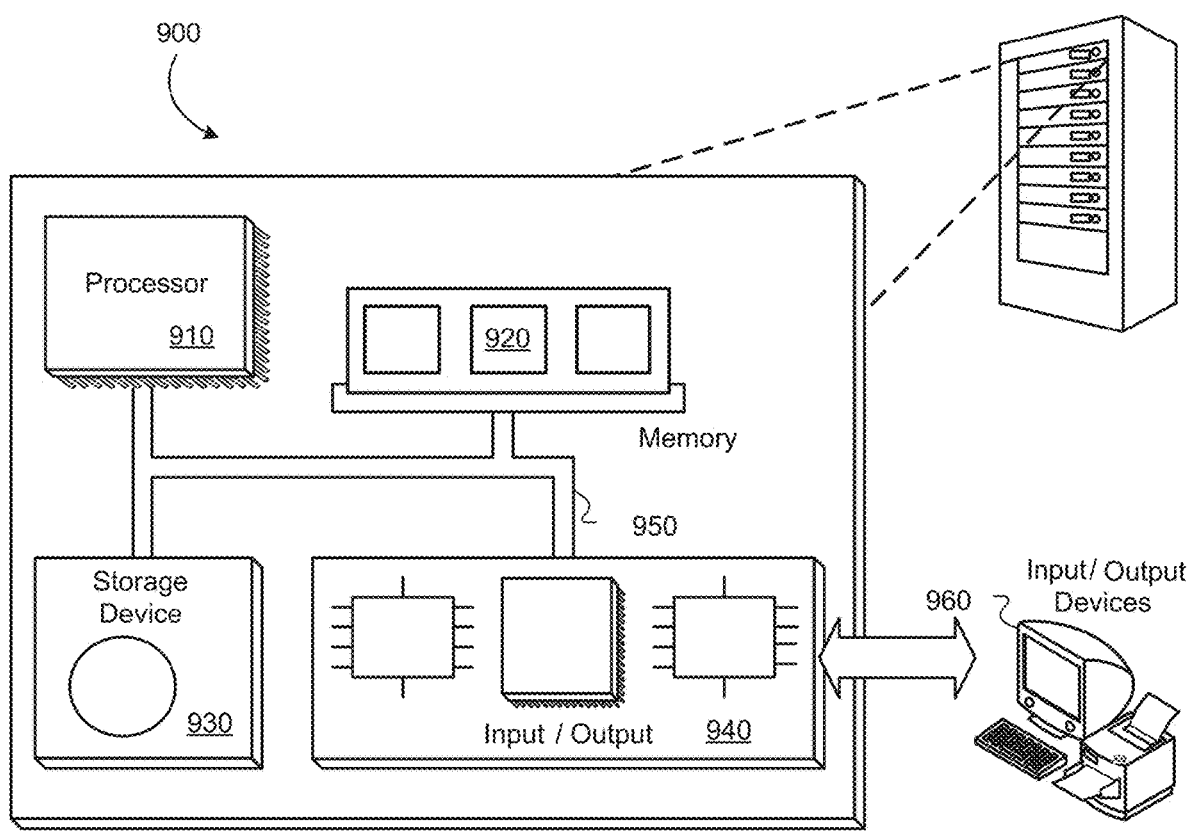
FIG. 9 is a diagram of an example computer system.

FIG. 9 shows an example computer system 900 that includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for tracking content represented in a resource, the method comprising:
receiving, by at least one processor, a modified version of structure data comprising a description of a resource that includes at least one element, wherein each element represents content of the resource in the structure data and wherein each element includes a portion of the structure data that defines the content;
receiving, by the at least one processor, data specifying a target element of the structure data, the modified version of the structure data including a modified version of the target element;
obtaining, by the at least one processor, a plurality of locators for the target element, wherein at least one of the locators of the plurality is derived as a function of a frequency that a combination of a subset of attributes and classes of the target element appears in the structure data, the at least one locator comprising the subset of the attributes and the classes, the subset uniquely identifying the target element in the structure data; and
applying the plurality of locators including the at least one locator to the modified version of the structure data to extract the modified version of the target element.

2. The method of claim 1, further comprising:
receiving, by the at least one processor, the structure data comprising the description of the resource, the structure data comprising the target element;
determining, by the at least one processor, the frequency that each of one or both of attributes and class of the target element of training data appear in the structure data; and
generating, by the at least one processor, the at least one locator based on the frequency.

3. The method of claim 2, wherein the at least one locator is a first locator comprising a first subset, the method further comprising:
generating a second locator associated with the target element, the second locator comprising a second subset of one or both of the attributes and the class, the second subset being different from the first subset;
generating a first weight value for the first locator based on a first frequency of the first subset occurring in the structure data; and
generating a second weight value for the second locator based on a second frequency of the second subset occurring in the structure data.

4. The method of claim 3, wherein extracting the modified version of the target element comprises:
identifying, by each of the first locator and the second locator, a respective element of the modified version of the structure data as being a candidate modified version of the target element so as to provide a plurality of candidate modified versions of the target element; and
selecting the modified version of the target element from the plurality of candidate modified versions of the target element based on the respective first and second weight values of the first and second locators.

5. The method of claim 4, further comprising:
determining that at least one locator, of the first locator and the second locator, selected an incorrect element as being the modified version of the target element; and
updating the at least one locator to include a different combination of one or both of attributes and class based on another locator that correctly selected the target element.

6. The method of claim 3, wherein the second locator comprises an absolute X-path associated with the target element.

7. The method of claim 2, wherein the at least one locator comprises one or more attributes or classes of a parent element.

8. The method of claim 2, wherein the at least one locator is associated with a weight value based on training data.

9. The method of claim 8, wherein the training data is generated based on a plurality of selections of different occurrences of the element in the resource by a user.

10. The method of claim 8, wherein the training data are automatically generated based on a simulated modification to the resource.

11. The method of claim 2, further comprising:
retrieving an X-path associated with the target element; and
parsing the X-path to identify one or both of the attributes and the class of the target element.

12. The method of claim 1, further comprising updating the locator based on one or both of updated attributes and an updated class of the modified version of the target element.

13. The method of claim 1, wherein at least five locators are obtained for the target element.

14. The method of claim 1, wherein the element corresponds to a graphical feature of the resource that is configured for presentation when the resource is accessed.

15. The method of claim 1, wherein the structure data comprising the description of the resource comprises a Document Object Model (DOM).

16. The method of claim 1, wherein each locator of the plurality is associated with a weight value based on a type of the respective locator, and wherein the type of the respective locator corresponds to a process for generating the respective locator.

17. A system for tracking content represented in a resource, the system comprising:
at least one processor; and
a non-transitory computer-readable medium including one or more sequences of instructions, which, when executed by the at least one processor, causes:
receiving, by the at least one processor, a modified version of structure data comprising a description of a resource that includes at least one element, wherein each element represents content of the resource in the structure data and wherein each element includes a portion of the structure data that defines the content;
receiving, by the at least one processor, data specifying a target element of the structure data, the modified version of the structure data including a modified version of the target element;
obtaining, by the at least one processor, a plurality of locators for the target element, wherein at least one of the locators of the plurality is derived as a function of a frequency that a combination of a subset of attributes and classes of the target element appears in the structure data, the at least one locator comprising the subset of the attributes and the classes, the subset uniquely identifying the target element in the structure data; and
applying the plurality of locators including the at least one locator to the modified version of the structure data to extract the modified version of the target element.

18. The system of claim 17, wherein the one or more sequences of instructions, which, when executed by the at least one processor, further cause:
receiving, by the at least one processor, the structure data comprising the description of the resource, the structure data comprising the target element;
determining, by the at least one processor, the frequency that each of one or both of attributes and class of the target element of a training data appear in the structure data; and
generating, by the at least one processor, the at least one locator based on the frequency.

19. The system of claim 18, wherein the at least one locator is a first locator comprising a first subset, and wherein the one or more sequences of instructions, which, when executed by the at least one processor, further cause:
generating a second locator associated with the target element, the second locator comprising a second subset of one or both of the attributes and the class, the second subset being different from the first subset;
generating a first weight value for the first locator based on a first frequency of the first subset occurring in the structure data; and
generating a second weight value for the second locator based on a second frequency of the second subset occurring in the structure data.

20. A non-transitory computer-readable medium including one or more sequences of instructions, which, when executed by at least one processor, causes:
receiving, by the at least one processor, a modified version of structure data comprising a description of a resource that includes at least one element, wherein each element represents content of the resource in the structure data and wherein each element includes a portion of the structure data that defines the content;
receiving, by the at least one processor, data specifying a target element of the structure data, the modified version of the structure data including a modified version of the target element;
obtaining, by the at least one processor, a plurality of locators for the target element, wherein at least one of the locators of the plurality is derived as a function of a frequency that a combination of a subset of attributes and classes of the target element appears in the structure data, the at least one locator comprising the subset of the attributes and the classes, the subset uniquely identifying the target element in the structure data; and
applying the plurality of locators including the at least one locator to the modified version of the structure data to extract the modified version of the target element.

* * * * *